Patented June 21, 1938

2,121,077

UNITED STATES PATENT OFFICE 2,121,077

GLASS-CLEAR SYNTHETIC RESIN PRODUCT AND PROCESS OF MAKING SAME

Carleton Ellis, Montclair, N. J., assignor to Ellis-Foster Company, a corporation of New Jersey No Drawing. Application April 1, 1936,
Serial No. 72,052

2 Claims. (Cl. 260—3)

This invention relates to a urea-thiourea-formaldehyde resin for making water-white glass-clear products useful for purposes where a so-called non-breakable glass is desired, for various novelty articles, and for certain technical uses in the molding art.

This application continues subject matter from application Serial No. 426,192 filed February 5, 1930 now Patent No. 2,092,502, dealing with the condensation of urea and thiourea with formaldehyde and the hot pressing of the condensation product in the presence of a curing catalyst, especially one having fluxing properties. The claims of application Serial No. 426,192 are directed mainly to the manufacture of veneers from urea-formaldehyde condensation products.

Transparent urea resin articles have been known, but such articles have generally been manufactured by a casting process involving pouring of a resin in the liquid state (usually a solution of resin in water) into a mold and not utilizing any pressures above atmospheric. Objects made by such a method have enjoyed no considerable commercial success for several reasons, the principal ones being the inevitable development of cracks and fissures on aging, and poor water resistance.

In the present invention, the method reduces and alleviates these tendencies to a very considerable degree. The process of hot molding used herein permits substantially stable glass-clear articles to be produced which show adequate resistance to water and to aging.

The resin lends itself readily to production of glass substitutes, both water-white and colored, and of such novelty articles as, for instance, buttons, lamp shades, illuminated dials and scales, jewelry, and ornaments of various kinds. It may be colored by dyes and still retain its transparency; it may be made translucent or even opaque, if desired, by incorporation of a wide variety of substances among which may be mentioned mineral powders and fibers, ground cotton, paper shreds, and the like, which may be colored if desired, and molded with the transparent material in such a way that a mottled or stratified effect is obtained. Particularly attractive objects may be made by combining this resin with other molding compositions, or two or more modifications of this resin, either translucent, opaque, or transparent, in such a way that the object is composed of two or more parts or sections which, being molded simultaneously, are firmly united to form a single object.

In carrying out the invention, the process may be conveniently divided into four stages: (1) reaction of urea with formaldehyde, (2) further reaction with thiourea, (3) dehydration, and (4) forming an article.

*First stage: Reaction of urea with formaldehyde.*—In reacting urea with formaldehyde, I preferably use a slight excess over two moles of formaldehyde to one of urea, a convenient ratio being 2.3 to 1, but the limits may vary from 2.1:1 to 3:1, or even more. The use of less than 2 moles of formaldehyde to one of urea tends to give a turbid product. The excess formaldehyde is later taken up by the thiourea as will be described in Stage 2. The urea should be of good grade. Ordinary commercial formalin provides a satisfactory source of formaldehyde, but aqueous solution of other strength, or polymers such as paraformaldehyde or trioxymethylene may be used if desired.

A very important point in controlling the reaction is the regulation of the hydrogen ion concentration. The urea and formaldehyde reaction mixture may be maintained at a pH of 5 to 8, but more certain results are obtained by adjusting the initial formaldehyde to a pH of 6.5 to 7.5. Ordinarily, commercial formalin contains sufficient acid to have a pH in the neighborhood of 2. This value may be adjusted by addition of an inorganic or organic base, or other substance providing an alkaline reaction. Dilute sodium hydroxide solution provides a simple and economical means for reducing the hydrogen ion concentration or raising the pH.

Having the desired amount of neutral formaldehyde solution, the urea is dissolved in it. The solution is heated to boiling under refluxing conditions. In certain cases it may be advantageous to add more alkaline substance to maintain the pH at 6.5 to 7.5 until boiling commences. Once the reaction has begun the source of heat is removed as the exothermic nature of the reaction will maintain boiling for a short time. When the ebullition subsides heat may again be supplied. The reaction should proceed until an initial condensation product is obtained. As the reaction goes on, the solution will become more acid, ultimately attaining a value of pH 5 to 5.5. It is preferably stopped before this condition is reached, but in some cases it is necessary to continue the boiling until this acidity is obtained. The time required for this first stage usually amounts to several minutes, depending among other things on the size and type of apparatus used.

*Second Stage: Addition of Thiourea.*—The amount of thiourea used may vary over a considerable range, depending on the ultimate purpose to which the material is to be put. Lesser amounts reduce the material cost of the resin and greater amounts increase the water resistance. In any case, the amount should not be greater than that required to reduce the molar ratio of formaldehyde to ureas (i. e., urea plus thiourea) to 1.75 to 1. An ultimate ratio of less than 1.75 moles of formaldehyde to one of ureas usually causes a turbid or milky product to be obtained. On the other end of the limits, an ultimate molar ratio of formaldehyde to ureas may desirably be less than 2 to 1, as amounts of formaldehyde greater than this tend also to decrease water resistance. The molar ratio of thiourea to urea may advantageously vary from 1:1 to 1:16, the initial ratio of formaldehyde to urea being adjusted to provide upon addition of thiourea an ultimate ratio as prescribed immediately above.

The thiourea may advantageously be subjected to a purification process such as, for example, recrystallization or at least filtration of a solution. Before use I prefer to recrystallize the thiourea from a filtered slightly ammoniacal solution (containing a decolorizing agent such as bone black or activated charcoal if necessary).

Such purified material may be added in the solid state to the hot urea-formaldehyde solution, or it may be dissolved in hot water, refiltered, and the solution added. The latter method is desirable as it provides another step for elimination of dirt, avoids local high concentrations of ureas, and does not cool the reaction mixture excessively.

The pH of the reaction mixture during the second stage should be subjected to the same rigid control as in the first stage. In this case the limits may lie between pH 4.5 and 5.5 or 6. I prefer to have the syrup from the first stage at a pH of 5.0. As noted, the first stage reaction may be allowed to proceed until this value is spontaneously attained. If it be required not to continue the first stage reaction long enough to obtain this value, the pH of the solution may be adjusted by careful addition of an acid or acid reacting substance. A weak solution of hydrochloric acid provides a simple and economical means of obtaining the desired results.

Having then the urea resin syrup from the first stage at the correct acidity, the thiourea is added, heat is applied, and the reaction mixture is boiled further under reflux until the thiourea has reacted with the urea-formaldehyde condensate. The time required for this to take place may vary from 1 to 5 or more times that required for the first stage. By varying this time, as well as that of the first stage, the flow of the resulting resin on molding may be changed. Increases of reaction times tend to decrease the ease of flow.

When the desired reaction has taken place, boiling is stopped and the pH is raised to 5 to 8, preferably 6.5—7.0.

*Third Stage: Dehydration.*—The product from the second stage is preferably in the form of a thin water-white syrup. I prefer to concentrate the solution to a very viscous state by boiling off a major part of the water at reduced pressure at approximately 90° C. This may be accomplished, for example, by heating the material in a water bath, and removing the vapor by means of a vacuum pump.

If it be desired to modify the resin in any manner such as to be presently disclosed, it is convenient to do so before, during, or after the syrup is concentrated. For example, if the resin is to be colored, a dye may be added; or if a curing catalyst is added it may be incorporated at this stage.

The very viscous mass is placed in shallow containers, so as to expose maximum surface, and further dehydrated under vacuum, preferably at a temperature between 50° and 90° C. I have found that aluminum containers are suitable for the process, but other materials may be used. By carrying out the final dehydration in vacuo, the resin becomes a frothy, solidified mass which is easily ground to a powder. If desired, the resin may be ground and further dried to eliminate last traces of water.

Drying may be done at atmospheric pressure without reducing the transparency, but the final form of the material is not so conducive to easy pulverization and, because of the longer time required for drying, the flow of the resin may be reduced.

Another method of concentration is to pour the reaction mixture from Stage 2 into a large volume of water. The resin precipitates and the supernatant liquid may be decanted. The layer of resin may be then dried in vacuo with the same results described above. This procedure tends to increase resistance to water. It is also possible to spray-dry the syrup.

*Fourth Stage: Forming an Article.*—After the resin is dried it may be ground to a coarse or fine powder and hot molded. The grinding is conveniently accomplished in a grinder or a ball mill. It is not necessary to have the resin extremely fine, but it is sufficient to reduce the size merely to eliminate or reduce gases which may be entrapped.

In certain cases it is advisable to add modifying agents during the grinding stage. For instance, powdered mica, silex, ground cotton, a pigment, or other material may be placed in a ball mill with the resin and thoroughly mixed together.

It is not advisable to add a lubricant to the resin if a transparent material is desired. Extremely small amounts of ordinary lubricating agents tend to reduce the transparency to a marked degree. If a lubricant should prove necessary for molding, it may, e. g., be applied in a very thin film directly to the die surface.

As with other resins, the pressure, temperature, and time of molding varies with the nature of the article to be produced. A range of temperature for hand presses is from 135° C. to 150° C. If automatic presses are used the molding temperature may be somewhat higher. The pressures are apt to prove slightly higher than for ordinary work, but approximately 4000 pounds per square inch is usually satisfactory. The flow may be modified so that more or less pressure may be used, in a manner subsequently to be mentioned. The time required for cure is the same as for other types of urea resin.

A novel feature of the invention may be noted here. Ordinarily a resin containing thiourea requires an appreciably longer time to effect the same degree of polymerization obtained in a straight urea resin. In the present case, however, not only is the time no greater but the resin cures without use of an added curing catalyst.

An object hot-pressed as disclosed herein is glass-clear, water-white, lustrous, hard (about 2.5 in the Mohs scale), resistant to shock, machinable, and resistant to water. A molding may be immersed in water for 30 minutes without becoming soft or discoloring. On repeated cycles of immersion in water and drying, however, the resins show signs of cracking; but it is very much more resistant to such treatment than are cast articles, since the latter usually crack eventually through mere fluctuation of atmospheric conditions.

*Modifications.*—If it be desired to increase or soften the flow of the resin on molding, certain plasticizers may be added, preferably during the concentration step of Stage 3. Among the materials which are effective may be mentioned sugar (sucrose), formamide, benzyl alcohol, glycerol, glycols, polyvinyl alcohol, and ketone-formaldehyde condensation products. Triacetin is particularly adaptable in this connection, for it does not tend to decrease water resistance. Plasticizers preferably include those which do not reduce the water-white transparency of the resin. If the flow is required to be harder, the incorporation of starch will accomplish this without sacrificing transparency.

Although the resin might be termed "self curing", in some instances it may prove desirable to add such curing catalysts as glycerol dichlorhydrin, salts of chloracetic acid, hexamethylenetetramine, or triacetin, its homologues and related compounds such as glycerol benzoate, glycol diacetate, diethyleneglycol acetate, sodium ethyl phthalate and the like. The last group of substances may serve the double purpose of catalyzing cure and plasticizing.

Cost of the resin may be decreased by adding relatively inexpensive materials which do not cause deleterious effects and which improve the qualities necessary for a specific desired result. Among the substances which may be added which do not decrease transparency may be mentioned sugars and starches. When starch is used it is to be noted that the carbohydrate is substantially dispersed by the resin so that the product remains transparent.

In those instances where transparency is not necessary or desired, various substances which alter the appearance of a molding may be incorporated. For example, pigments of various shades, ground cotton, paper cuttings, mineral fillers such as asbestos, silex, barytes, and whiting, and the like may be placed with the resin in a ball mill, and the whole ground and mixed together before molding.

Decorative effects may be obtained by including a variety of substances. Material which dissolves, disperses or is extremely finely divided will modify the resin as a whole; dyes may color it any desired shade. If coarser particles are used, heterogeneous masses are obtained. Thus, if the resin be mixed with particles of mica a spangled glistening molding is obtained; the effect is especially good if the mica be mixed with a transparent resin colored blue. Substances imparting an opalescent and iridescent sheen may be added to produce a pearl effect. By molding a mixture of the powered transparent resin with granules of colored translucent or opaque molding compositions, mottled effects are produced. Aluminum bronze or other gilding powders may be utilized to furnish a metallic appearance. If they are ground with the resin a dull tarnished object results on molding; if, however, the powdered metal be applied to the die the coating adheres to the resin, producing a metallic lustrous surface, the molding appearing as if made of metal. A suggested use for this modification is in the production of bottle caps.

The transparency of the resin allows designs of various sorts to be included and incorporated in a molding. A picture, drawing, piece of cloth, or similar flat object, may be placed between layers of unmolded or partially molded resin, and when molding has been completed the design becomes imbedded within and is an integral part of the object and is perfectly apparent through the layers of transparent resin. If desired, one resin layer may contain a substance to produce a degree of translucency or opacity, or may be of different color, while the other layer may be transparent; the design then being between the two layers may easily be seen through the transparent layer and obscured wholly or partially when viewed through the other layer. A specific novelty produced by this method may consist of a backing layer of translucent or opaque material, a picture or photograph, and a covering layer of transparent resin, around the edges of which may run a metallic border produced by applying aluminum bronze to the die; the whole being hot pressed together to form a picture and its frame as one unit. The imbedding of objects within a molding is not confined to flat pieces; an article of more or less complex shape may be centered in the molded mass of transparent resin which may serve as a decorative and protective layer around it.

Another novel method of decorating objects utilizing the transparent resin is as follows: A molding is made of a colored transparent, translucent, or opaque composition (one containing about 60% urea resin and 40% cellulose, suitably colored, is convenient). The object is left in or replaced in the same die or in a die similar to that in which it was molded, and a small amount of transparent molding resin is placed on the pre-molded article. The whole is subjected to hot pressing again. The unmolded powdered resin causes unequal application of pressure when the die is closed, and as a result the pre-molded object is cracked. The fissures are filled by the transparent resin, and thus the second molding operation yields a product which appears to be broken but which feels perfectly smooth to the touch. This produces a unique effect.

Certain specific uses will now be suggested, but the invention is not to be considered limited by them or by the specific examples which follow, for the nature of the invention permits of innumerable possibilities and it is manifestly impossible to cite all of them.

Besides those uses included in the foregoing discussion, certain articles in particular may possess especial advantages when molded from my transparent resin. Lamp shades and globes when formed from the glass-clear water-white or colored material will transmit very high proportions of light and have a considerable advantage over glass of being shock resistant. Buttons may be formed, as well as costume jewelry of all sorts, handles for knives, tools, umbrellas, and the like. Fireproof, shock-resisting, brilliantly colored Christmas tree ornaments may be produced.

The possibility of use for a glass substitute is too obvious and has been frequently discussed elsewhere to be more than mentioned here; lenses and glass-like sheets are suggested. A novel use for the invention is in experimental and research work. In molding compositions, substances of various kinds have been proposed as fillers or extenders. The degree to which transparency or translucency is increased or diminished by these substances may be observed by incorporating them with the transparent resin of this invention and molding the resulting mixture. It is customary to incorporate in a molding composition a small amount of a metallic soap to act as a lubricant on molding. It has been shown by mixing a small fraction of a per cent in the transparent resin and molding, that the pigmenting or hiding power of such a soap is high, and that consequently the translucency of a compound in which such an ingredient is used, is decreased. Proper selection and proportioning of lubricants can be arrived at by studying their effect in this transparent resin.

It has also been determined that certain curvatures and areas in a die may set up objectionable stresses and resultant strains in that portion of a molded article formed by such an area. These strained portions may lead to fracture on mechanical shock. They also have a tendency to increase with various climatic fluctuations, eventually causing disruptions. Electrical properties may also be affected. In particular the region of cut-off and points causing sharp change in direction of flow during formation of an article are liable to cause strains in a molded article. Such areas are easily located and classified by molding an article of the transparent resin and examining the molding under plane-polarized light. The strains in the molding result in slight changes of refractive index in the material so that the extent and position of the stresses is betrayed by a single or repeated spectrum or play of colors over the strained area. This phenomenon may disclose valuable information concerning the extent and magnitude of stresses occurring in molded objects of all descriptions. If it is known where stresses are produced by a die, corrective designing is possible. The value of the resin is at once apparent in this connection.

Examples illustrative of the invention follow. Parts are by weight.

*Example 1.*—720 parts of 38.5% formalin were adjusted to have a pH of 5.5 with dilute sodium hydroxide. 252 parts of Grade A urea were dissolved in the formaldehyde, and the solution was heated to boiling under a reflux condenser. Boiling was continued for 10 minutes, when 90 parts of commercial thiourea were added. The whole was boiled for 40 minutes more, filtered and dried in a vacuum oven at 86° C. for 13 hours.

The dried material was ground and molded at 140° C., 3500 pounds per square inch, for 5 minutes, breathing the mold. Transparent moldings free from bubbles and blisters were obtained.

*Example 2.*—A portion of commercial thiourea was dissolved in about an equal weight of boiling water. Activated charcoal and animal charcoal were added and allowed to remain in contact with the solution for several minutes with stirring. A small amount of ammonium hydroxide was added, and the solution boiled. The hot liquid was filtered, the filtrate cooled and the crystallized thiourea which deposited was washed in cold water and dried.

Using 90 parts of the purified thiourea dissolved in hot water, Example 1 was repeated. The yield was 405 parts of dry resin. The moldings obtained were water-white and glass-clear.

*Example 3.*—720 parts of 38.5% formalin and 252 parts of Grade A urea were refluxed for 10 minutes at pH 5.5. A solution of 45 parts of purified thiourea dissolved in an equal amount of hot water was added, and the whole refluxed for a total of 50 minutes. The clear resin syrup was poured into an aluminum pan and dehydrated at 86° C., 29 inches of mercury vacuum. When the dried pulverized resin was molded at 140° C., 4000 pounds per square inch, for 5 minutes, clear, transparent moldings were obtained.

*Example 4.*—720 parts of 38.5% formalin (pH 5.5) and 252 parts of urea were refluxed for 10 minutes, when 90 parts of thiourea dissolved in hot water were added. The whole was boiled 40 minutes more. The clear syrup resulting was concentrated to a thick viscous mass by boiling under reduced pressure over a water bath. Dehydration was completed at atmospheric pressure and 64° C. in a current of air. The moldings obtained at 140° C., 4000 pounds per square inch, were transparent.

*Example 5.*—480 parts of 38.5% formalin were adjusted to a pH 6.5 and 168 parts of urea were dissolved in it. The solution was boiled under reflux for 10 minutes. A few drops of dilute hydrochloric acid were added to adjust the pH to 5.0, and 30 parts of thiourea dissolved in hot water were added. The whole was refluxed 40 minutes more. The pH was then raised to 6.5 with dilute caustic and the syrup was concentrated under vacuum over a water bath to a very viscous mass which was further dehydrated at 86° C. in a vacuum oven to yield a hard foamy mass.

The ground resin was further dried for a short time in vacuo and then molded at 140° C., 4000 pounds per square inch, for 5 minutes. Excellent, very clear moldings were obtained. The resin was also molded for 10 minutes with identical results.

*Example 6.*—Example 5 was repeated using only 20 parts of thiourea with excellent results.

*Example 7.*—Example 5 was repeated using 15 parts of thiourea. The resin in this case was slightly cloudy. The limit of thiourea for transparency had apparently been passed.

*Example 8.*—1000 parts of 37% formaldehyde were adjusted to a pH 7.0 with sodium hydroxide. 325 parts of urea were dissolved in the formalin, and the solution was boiled under refluxing conditions for 10 minutes. The pH of the batch spontaneously fell to 5.5, then 110 parts of purified thiourea, dissolved in water, were added. The whole was boiled for 30 minutes more, and the pH was again raised to 6.5. The syrup was concentrated on a water-bath using a reduced pressure until the mass became very viscous and frothy. It was then transferred to a shallow aluminum pan and dehydrated in a vacuum oven at 86° C.

The ground material, when molded at 140° C., 4000 pounds per square inch, produced glass-clear, water-white, water-resistant objects.

*Example 9.*—Example 8 was repeated, adding 19 parts more thiourea just prior to concentration of the syrup over water bath under vacuum. The moldings from this composition were transparent and could be immersed in boiling water 30 minutes without becoming soft or discolored.

*Example 10.*—The resin obtained as per Example 8 was ground in a ball mill with 5% thiourea. The moldings obtained from this composition were very hazy with specks of white thiourea on the surface.

*Example 11.*—350 parts of 37% formaldehyde and 50 parts of formamide were adjusted to a pH of 6.5. 84 parts of urea were added to the solution which was then boiled under reflux for 10 minutes. The mixture became quite acid during boiling; it was adjusted to pH 5.5 with dilute caustic soda, and 30 parts of thiourea dissolved in water were added. The whole was refluxed 40 minutes, the pH adjusted to 5.5 again, and concentrated under vacuum over a water bath. The thick syrup was finally dried at 86° C., 29 inches of mercury vacuum.

The ground resin was molded at 140° C., 4000 pounds per square inch. The composition was soft flowing, and the moldings were clear, plastic and elastic when cold.

*Example 12.*—280 parts of 37% formaldehyde (pH 6.5), 84 parts of urea and 25 parts of benzyl alcohol were boiled under reflux for 10 minutes. The pH was lowered to 5.0 with dilute hydrochloric acid, and 25 parts of thiourea were added. The whole was refluxed for 40 minutes more, concentrated and dried in vacuo.

The resin was molded at 140° C., 4000 pounds per square inch, for 5 minutes. The flow was good, and the cups were transparent, quite soft and elastic when hot and pliable when cold. A molding was immersed in boiling water 15 minutes but the glaze was undiminished and the surface did not soften or discolor.

*Example 13.*—Example 9 was repeated, substituting cane sugar for the benzyl alcohol. The composition in this case was very soft flowing, yielding well formed, glass-clear objects.

By doubling the amount of sugar, the other constituents remaining the same, the flow was rendered so soft that an article could be formed at a pressure of 300 pounds per square inch.

*Example 14.*—1000 parts of 37% formalin (pH 7) and 315 parts of urea were boiled under reflux for 10 minutes, the pH spontaneously being lowered to 5. 112.5 parts of thiourea dissolved in water were added, and refluxing was continued for 30 minutes. To 500 parts of the clear syrup obtained were added 48 parts of corn starch. The mixture was turbid at first, but on concentrating in vacuo over a water bath it become perfectly clear and soon set to a thick jelly which was dehydrated at 86° C. in a vacuum oven.

When the ground dried resin was molded at 140° C., 4500 pounds per square inch, the flow was found to be quite hard, but the objects were glass-clear.

*Example 15.*—Several batches of resin were prepared following the procedure of Example 7. After the reaction was completed and before concentrating, a dye such as Crocein Scarlet, Soluble Blue (Schultz No. 539), and fluorescein was incorporated in each batch. Dehydration and molding were carried out as described in Example 7.

The articles were transparent and brilliantly colored.

*Example 16.*—Batches of transparent resin were prepared as per Examples 7 and 13. The dried resins were ball milled with flakes of mica and the mixture molded. The articles had a glistening, spangled appearance, particularly under artificial light.

*Example 17.*—Batches of transparent resin were prepared as per Examples 7 and 13. The dried ground resins were mixed with granules of a urea resin molding composition containing various colored dyes and alpha cellulose. On molding at 140° C., 4000 pounds per square inch, for 5 minutes, the objects presented a mottled appearance.

*Example 18.*—A die heated to 140° C. was given a thin coating of zinc stearate. On this was dusted aluminum bronze. A soft flowing resin was placed in the die and molded at 4000 pounds per square inch for 5 minutes. The molding possessed a lustrous, polished, metallic surface.

*Example 19.*—520 parts of 37% formaline (pH adjusted to 7 with sodium hydroxide) and 168 parts of urea were boiled under reflux for 10 minutes. The pH was adjusted to 5, 60 g. thiourea dissolved in hot water were added, and the whole further refluxed for 30 minutes. The pH was adjusted to 7 and the solution concentrated to a fairly viscous liquid over a water bath, using reduced pressure. At this point, 6 parts of triacetin were added, the pH again adjusted to 7, and the resin was dehydrated in vacuo.

The ground material was molded at 140° C., 4000 pounds per square inch, for 5 minutes, and proved to be very soft flowing. A molding was immersed in boiling water for 20 minutes without being affected.

What I claim is:

1. The process of making a hard transparent article, comprising adding to more than 2 moles of aqueous formaldehyde in one step 1 mole of urea, effecting reaction between the urea and formaldehyde while maintaining a pH of 5 to 8, adding thiourea in one step to the resulting condensation product in an amount such that the ratio of total ureas to formaldehyde is 1 to not less than 1.75, heating the reaction mixture while maintaining the pH between 4.5 and 6 to cause reaction of the thiourea, subjecting the resulting condensation product to a dehydration under reduced pressure at a temperature of from 50 to 90° C., grinding the dry product to form a molding composition, and subjecting said composition to heat and pressure.

2. A transparent, lustrous, hard, shock-resistant, machinable and water-resistant product obtainable according to the process of claim 1.

CARLETON ELLIS.